US008892046B2

(12) United States Patent
Hera

(10) Patent No.: US 8,892,046 B2
(45) Date of Patent: Nov. 18, 2014

(54) AUTOMOBILE COMMUNICATION SYSTEM

(75) Inventor: Cristian Hera, Lancaster, MA (US)

(73) Assignee: Bose Corporation, Framingham, MA (US)

(*) Notice: Subject to any disclaimer, the term of this patent is extended or adjusted under 35 U.S.C. 154(b) by 269 days.

(21) Appl. No.: 13/433,382

(22) Filed: Mar. 29, 2012

(65) Prior Publication Data

US 2013/0260692 A1 Oct. 3, 2013

(51) Int. Cl.
H04B 15/00 (2006.01)

(52) U.S. Cl.
USPC ............ 455/63.1; 381/86; 704/226; 704/233; 340/988

(58) Field of Classification Search
CPC .................................................. H04W 16/14
USPC ........................................................ 455/63.1
See application file for complete search history.

(56) References Cited

U.S. PATENT DOCUMENTS

| 4,538,295 | A | * | 8/1985 | Noso et al. ..................... 704/248 |
| 4,641,344 | A | * | 2/1987 | Kasai et al. ...................... 381/57 |
| 4,959,865 | A | * | 9/1990 | Stettiner et al. ................ 704/233 |
| 5,220,610 | A | * | 6/1993 | Kane et al. ..................... 704/233 |
| 5,425,127 | A | * | 6/1995 | Yato et al. ...................... 704/234 |
| 5,533,133 | A | * | 7/1996 | Lamkin et al. ................ 381/94.5 |
| 5,611,019 | A | * | 3/1997 | Nakatoh et al. ................ 704/233 |
| 5,850,458 | A | * | 12/1998 | Tomisawa et al. ............ 381/71.4 |
| 5,872,852 | A | * | 2/1999 | Dougherty ....................... 381/57 |
| 6,356,185 | B1 | * | 3/2002 | Plugge et al. ............... 340/384.3 |
| 6,615,162 | B2 | * | 9/2003 | Bar-Or .......................... 702/191 |
| 6,674,865 | B1 | * | 1/2004 | Venkatesh et al. ............. 381/107 |
| 7,026,957 | B2 | * | 4/2006 | Rubenstein .................... 340/988 |
| 7,170,247 | B2 | * | 1/2007 | Yoshinaga et al. ............. 318/448 |
| 7,634,095 | B2 | * | 12/2009 | Arun ................................ 381/86 |
| 7,792,312 | B2 | * | 9/2010 | Inoue et al. ................... 381/71.9 |
| 7,873,173 | B2 | * | 1/2011 | Inoue et al. ................... 381/71.4 |
| 7,885,417 | B2 | * | 2/2011 | Christoph .................. 381/71.11 |
| 7,907,736 | B2 | * | 3/2011 | Yuen et al. ......................... 381/1 |
| 7,979,147 | B1 | * | 7/2011 | Dunn .............................. 700/94 |
| 8,068,619 | B2 | * | 11/2011 | Zhang et al. .................... 381/92 |
| 8,111,834 | B2 | * | 2/2012 | Kobayashi et al. ........... 381/71.4 |
| 8,155,343 | B2 | * | 4/2012 | Honji et al. ..................... 381/86 |
| 8,194,873 | B2 | * | 6/2012 | Pan et al. .................... 381/71.11 |

(Continued)

FOREIGN PATENT DOCUMENTS

| EP | 1531605 | 5/2005 |
| WO | 2008/002873 | 1/2008 |

OTHER PUBLICATIONS

International Preliminary Report on Patentability dated Oct. 9, 2014 for International application No. PCT/US2013/029354.

Primary Examiner — Hai V Nguyen

(57) ABSTRACT

In an aspect, in general, an automobile communication system includes a first signal input for receiving an input signal from a sensor, a second signal input for receiving a first signal representing a rotational frequency associated with a portion of an engine of the automobile, an engine noise estimation module, and a transmitter. The engine noise estimation module is configured to determine an estimate of an engine-related component of the input signal based on the input signal and the first signal and to form a modified input signal. The engine noise estimation module includes a signal combination module configured to form the modified input signal, including combining the estimate of the engine-related component with the input signal. The transmitter is configured to transmit the modified input signal as part of an outgoing communication.

14 Claims, 4 Drawing Sheets

(56) References Cited

U.S. PATENT DOCUMENTS

| | | | | |
|---|---|---|---|---|
| 8,204,242 | B2* | 6/2012 | Pan et al. | 381/71.11 |
| 8,218,783 | B2* | 7/2012 | Katzer et al. | 381/73.1 |
| 8,229,125 | B2* | 7/2012 | Short | 381/56 |
| 8,300,842 | B2* | 10/2012 | Vaishya | 381/71.4 |
| 8,306,240 | B2* | 11/2012 | Pan et al. | 381/94.1 |
| 8,320,581 | B2* | 11/2012 | Hera et al. | 381/86 |
| 8,335,318 | B2* | 12/2012 | Pan | 381/56 |
| 8,355,512 | B2* | 1/2013 | Pan et al. | 381/71.11 |
| 8,380,508 | B2* | 2/2013 | Plumpe | 704/260 |
| 8,447,596 | B2* | 5/2013 | Avendano et al. | 704/226 |
| 8,504,362 | B2* | 8/2013 | Lee et al. | 704/233 |
| 8,521,530 | B1* | 8/2013 | Every et al. | 704/251 |
| 8,526,630 | B2* | 9/2013 | Sakamoto et al. | 381/86 |
| 8,532,828 | B2* | 9/2013 | Schramm et al. | 700/280 |
| 8,538,365 | B2* | 9/2013 | Croman et al. | 455/310 |
| 8,571,230 | B2* | 10/2013 | Pan et al. | 381/94.1 |
| 8,571,231 | B2* | 10/2013 | Ramakrishnan et al. | 381/94.2 |
| 8,606,573 | B2* | 12/2013 | Konchitsky | 704/233 |
| 8,649,533 | B2* | 2/2014 | MacNeille et al. | 381/110 |
| 8,649,923 | B2* | 2/2014 | Sankaran et al. | 701/22 |
| 8,694,310 | B2* | 4/2014 | Taylor | 704/226 |
| 2002/0097884 | A1* | 7/2002 | Cairns | 381/71.4 |
| 2004/0086135 | A1* | 5/2004 | Vaishya | 381/71.4 |
| 2004/0142672 | A1* | 7/2004 | Stankewitz | 455/296 |
| 2005/0187763 | A1* | 8/2005 | Arun | 704/226 |
| 2005/0207585 | A1* | 9/2005 | Christoph | 381/71.11 |
| 2005/0213776 | A1* | 9/2005 | Honji et al. | 381/86 |
| 2005/0231143 | A1* | 10/2005 | Yoshinaga et al. | 318/254 |
| 2005/0259830 | A1* | 11/2005 | Vaishya | 381/71.4 |
| 2006/0056642 | A1* | 3/2006 | Inoue et al. | 381/71.11 |
| 2006/0136199 | A1* | 6/2006 | Nongpiur et al. | 704/207 |
| 2006/0225984 | A1* | 10/2006 | Tanishima et al. | 192/48.8 |
| 2007/0038441 | A1* | 2/2007 | Inoue et al. | 704/226 |
| 2007/0297619 | A1* | 12/2007 | Pan | 381/71.11 |
| 2008/0292110 | A1* | 11/2008 | Kobayashi et al. | 381/71.4 |
| 2009/0205903 | A1* | 8/2009 | Evert et al. | 181/206 |
| 2010/0131642 | A1* | 5/2010 | Chalikouras et al. | 709/224 |
| 2010/0158263 | A1* | 6/2010 | Katzer et al. | 381/73.1 |
| 2010/0161326 | A1* | 6/2010 | Lee et al. | 704/233 |
| 2010/0239105 | A1* | 9/2010 | Pan | 381/94.9 |
| 2011/0083075 | A1* | 4/2011 | MacNeille et al. | 715/728 |
| 2011/0181442 | A1* | 7/2011 | Nakayama | 340/933 |
| 2011/0216916 | A1* | 9/2011 | Hera et al. | 381/86 |
| 2011/0216917 | A1* | 9/2011 | Ganeshkumar et al. | 381/86 |
| 2012/0148066 | A1* | 6/2012 | Honji et al. | 381/86 |
| 2012/0177214 | A1* | 7/2012 | Hera et al. | 381/73.1 |
| 2012/0269358 | A1* | 10/2012 | Gee et al. | 381/71.4 |
| 2013/0084818 | A1* | 4/2013 | Croman et al. | 455/226.1 |
| 2013/0156213 | A1* | 6/2013 | Pan et al. | 381/71.4 |
| 2013/0182864 | A1* | 7/2013 | Takahashi et al. | 381/61 |
| 2013/0185065 | A1* | 7/2013 | Tzirkel-Hancock et al. | 704/233 |
| 2013/0185066 | A1* | 7/2013 | Tzirkel-Hancock et al. | 704/233 |
| 2013/0185078 | A1* | 7/2013 | Tzirkel-Hancock et al. | 704/275 |
| 2013/0260692 | A1* | 10/2013 | Hera | 455/63.1 |
| 2013/0332175 | A1* | 12/2013 | Setiawan et al. | 704/500 |
| 2014/0205110 | A1* | 7/2014 | Hera | 381/86 |

* cited by examiner

AUTOMOBILE COMMUNICATION SYSTEM

BACKGROUND

This invention relates to automobile communication systems.

Automobile communication systems such as hands-free cellular telephone systems are often used to facilitate voice communication between an operator of an automobile and a remote telephone user over a voice communication channel.

During a hands-free telephone call, the environment of an automobile cabin typically includes both speech and ambient noise (e.g., road noise, engine noise, etc.). Ambient noise can have a negative effect on the quality and user experience of voice communications. Thus, it is desirable to transmit the speech over the voice communication channel while transmitting as little as possible of the ambient noise. For this reason, many conventional automobile communication systems include systems which reduce the amount of ambient noise that is transmitted over the voice communication channel while preserving speech.

SUMMARY

In an aspect, in general, an automobile communication system includes a first signal input for receiving an input signal from a sensor, a second signal input for receiving a first signal representing a rotational frequency associated with a portion of an engine of the automobile, an engine noise estimation module, and a transmitter. The engine noise estimation module is configured to determine an estimate of an engine-related component of the input signal based on the input signal and the first signal and to form a modified input signal. The engine noise estimation module includes a signal combination module configured to form the modified input signal, including combining the estimate of the engine-related component with the input signal. The transmitter is configured to transmit the modified input signal as part of an outgoing communication.

Aspects may include one or more of the following features.

The signal combination module may be configured to remove the estimate of the engine-related component from the input signal. The signal combination module may be configured to form a modified version of the estimate of the engine-related component and add the modified version of the estimate of the engine-related component to the input signal. The signal combination module may include a spectral shaping module configured to form the modified version of the estimate of the engine-related component including altering the spectral shape of the estimate of the engine-related component.

The system may also include an audio input for accepting an audio signal from an audio system of the automobile. The signal combination module may be further configured to form the modified input signal further including adding the audio signal to the input signal. The first signal may be associated with a number of revolutions per minute (RPM) of the engine of the automobile. The engine noise estimation module may also include a plurality of harmonic generators for generating a plurality of harmonics based on the first signal and a multi-input adaptive linear combiner for combining the plurality of harmonics.

In another aspect, in general, a method of enhancing communications in an automobile communication system includes receiving an input signal from a sensor, receiving a first signal representing a rotational frequency associated with a portion of an engine of the automobile, determining an estimate of an engine-related component of the input signal based on the input signal and the first signal, forming a modified input signal, including combining the estimate of the engine-related component with the input signal, and transmitting the modified input signal as part of an outgoing communication.

Aspects may include one or more of the following features.

Combining the estimate of the engine-related component with the input signal may include removing the estimate of the engine-related component from the input signal. Combining the estimate of the engine-related component with the input signal may include forming a modified version of the estimate of the engine-related component and adding the modified version of the estimate of the engine-related component to the input signal. Forming the modified version of the estimate of the engine-related component may include altering the spectral shape of the estimate of the engine-related component.

The method may also include accepting an audio signal from an audio system of the automobile where forming the modified input signal further includes adding the audio signal to the input signal. The first signal may be associated with a number of revolutions per minute (RPM) of the engine of the automobile. Determining the estimate of the engine-related component of the input signal may include generating a plurality of harmonics based on the first signal and combining the plurality of harmonics using a multi-input adaptive linear combiner.

Embodiments of the invention may have one or more of the following advantages.

Using the rotational frequency of the engine to estimate engine noise allows for faster tracking of changes in the engine noise than is possible with conventional spectral subtraction noise reduction techniques.

Removing the engine noise prior to application of a conventional noise reduction module enhances the performance of the conventional noise reduction module due to the reduced noise present at the input of the conventional noise reduction module.

Adding engine noise and/or music to a telephone conversation enhances the far end user experience of a hands-free communication device relative to the user experience of a conventional hands-free communication device.

The system and method described above allows the engine noise to be distinguished from other noise components (e.g., road noise) included in the ambient noise.

Other features and advantages of the invention are apparent from the following description, and from the claims.

DESCRIPTION

1 System Overview

Figure 1:
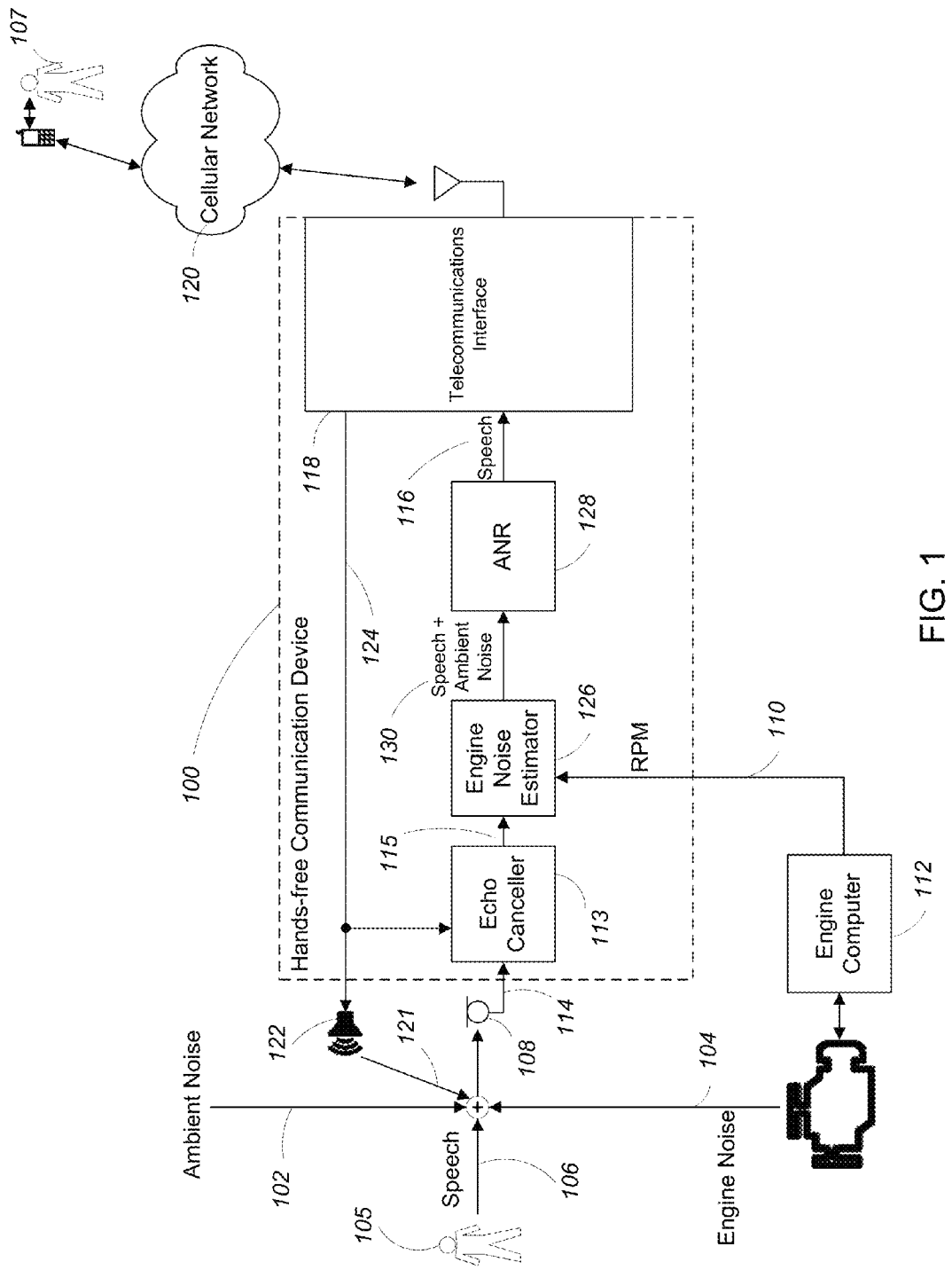
FIG. 1 is a block diagram of a first hands-free communication device.

Referring to FIG. 1, an automobile operator 105 communicates with a remote telephone user 107 through a hands-free communication device 100. The hands-free communication device 100 includes a speaker 122 which transduces an incoming signal 124 from the remote telephone user 107 into audible sound for the operator 105. The hands-free communication device 100 also includes a microphone 108 which senses a combination of non-engine related ambient noise 102, audible sound 121 produced by the speaker 122, engine noise 104, and the operator's speech 106 and transduces the sensed combination into a microphone signal 114. The hands-free communication device 100 also receives a revolutions per minute (RPM) signal 110, indicative of the rotational frequency of the engine, from an engine computer 112. The hands-free communication device 100 processes the microphone signal 114 on the basis of the RPM signal 110 and transmits the processed signal to a cellular network 120 and ultimately to the remote telephone user 107.

The hands-free communication device 100 also includes a conventional echo canceller 113, an engine noise estimator 126, a conventional active noise reduction (ANR) module 128, and a telecommunications interface 118. The first step in processing the microphone signal 114 includes providing the microphone signal 114 and the incoming signal 124 to the echo canceller 113 which removes the component related to the audible sound 121 produced by the speaker 122 from the microphone signal 114, resulting in an echo-free microphone signal 115. The echo-free microphone signal 115 and the RPM signal 110 are then provided to the engine noise estimator 126. The engine noise estimator 126 is an adaptive filter which leverages a-priori knowledge of a relationship between the RPM signal 110 and the harmonic structure of the engine noise 104 to determine an estimate of a component of the microphone signal 114 which is related to the engine noise 104. In the embodiment shown in FIG. 1, the engine noise estimator 126 removes the estimate of the component which is related to the engine noise 104 from the echo-free microphone signal 115, creating an engine noise-free signal 130. The engine noise-free signal 130 is substantially free of components of the microphone signal 114 which are related to the engine noise 104. Thus, the components of the microphone signal 114 which are present in the engine noise-free signal 130 are related to the ambient noise 102 and the speech 106. The engine noise estimator 126 is described in greater detail below in the discussion relating to FIG. 2.

The engine noise-free signal 130 is passed from the engine noise estimator 126 to the ANR module 128 (e.g., a spectral subtraction noise reduction module) which estimates the component of the microphone signal 114 which is related to the ambient noise 102. The ANR module 128 then generates a signal 116 for transmission by removing the estimate of the component of the microphone signal 114 from the engine noise-free signal 130. Thus, the signal 116 for transmission includes only the component of the microphone signal 114 which is related to the speech 106 and is substantially free of the components of the microphone signal 114 which are related to the audible sound 121, the ambient noise 102 and the engine noise 104.

The signal 116 for transmission is provided to a telecommunications interface 118 (e.g., a cellular radio) for transmission to a cellular network 120 and ultimately to a remote telephone user 107.

2 Engine Noise Estimation

Figure 2:
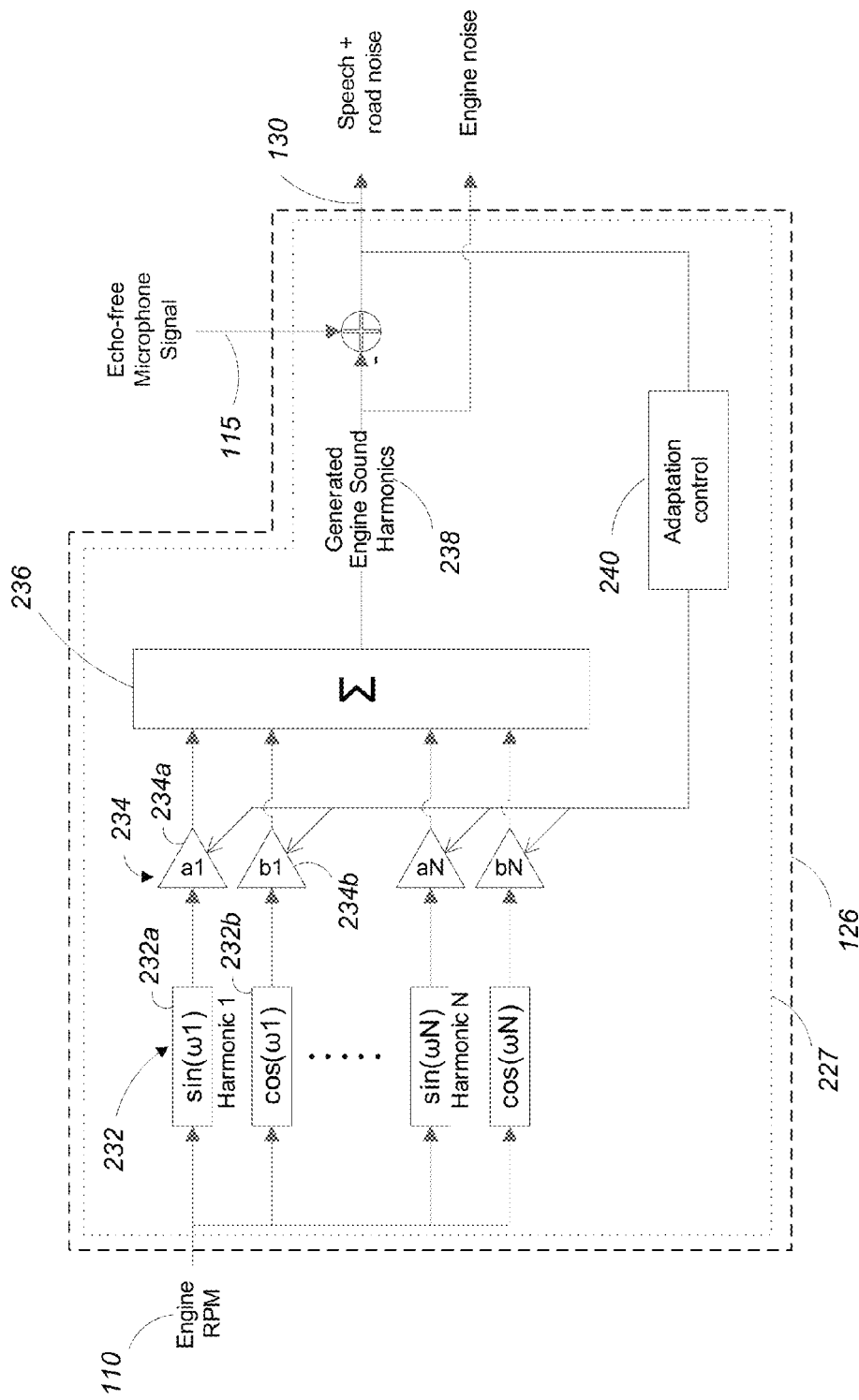
FIG. 2 is a block diagram of an engine noise estimator.

Referring to FIG. 2, one embodiment of an engine noise estimator 126 accepts the RPM signal 110 and the echo-free microphone signal 115 as inputs and processes the inputs 110,115 to generate the engine noise-free signal 130.

To estimate the engine noise 104 component of the microphone signal 114, the engine noise estimator 126 includes a multi-input adaptive linear combiner 227. The multi-input adaptive linear combiner 227 includes N harmonic frequency generators 232, N sets of harmonic frequency weighting coefficients 234, a summer 236, and an adaptation control module 240.

Each harmonic (referred to as $h_i(t)$ in the following section) included in the engine noise 104 can be described using the form:

$$h_i(t) = c_i(t) \cdot \sin(\omega_i(t) \cdot t + \varphi_i(t))$$
$$= c_i(t) \cdot \sin(\omega_i(t) \cdot t) \cdot \cos(\varphi_i(t)) + c_i(t) \cdot \cos(\omega_i(t) \cdot t) \cdot \sin(\varphi_i(t))$$
$$= a_i(t) \cdot \sin(\omega_i(t) \cdot t) + b_i(t) \cdot \cos(\omega_i(t) \cdot t)$$

where:

$$a_i(t) = c_i(t) \cdot \cos(\varphi_i(t))$$

and $$b_i(t) = c_i(t) \cdot \sin(\varphi_i(t))$$

Thus, to generate the unweighted sine and cosine components of the harmonics, each of the N harmonic frequency generators 232 includes both a sine component generator 232a and a cosine component generator 232b. When the harmonic frequency generators 232 receive the RPM signal 110, the RPM signal 110 is converted to a frequency and used by the sine and cosine component generators 232a, 232b to generate sine and cosine components for the frequency. For example, based on the RPM signal, the frequencies of both the sine component 232a and the cosine component 232b of the first harmonic generator are set to the fundamental frequency (i.e., 1·ω) of the engine noise 104, the frequencies of the sine and cosine components of the second harmonic frequency generator are set to twice the fundamental frequency (i.e., 2·ω) of the engine noise 104, the frequencies of the sine and cosine components of the third harmonic frequency generator are set to three times the fundamental frequency (i.e., 3·ω) of the engine noise 104, and so on. In some examples, the sine and cosine component generators 232a, 232b include lookup tables for generating the sine and cosine components.

The N sine components 232a and the N cosine components 232b generated by each of the harmonic frequency generators 232 are then passed to the N sets of harmonic frequency weighting coefficients 234. Each set of harmonic frequency weighting coefficients 234 includes a first weighting coefficient $a_i(t)$ 234a for weighting the sine component 232a of the generated harmonic frequency and a second weighting coefficient $b_i(t)$ 234b for weighting the cosine component 232b of the generated harmonic frequency.

After the generated harmonic frequency components 232a, 232b for each of the harmonic frequency generators 232 are weighted by their corresponding harmonic frequency weighting coefficients 234a, 234b, all of the weighted harmonic frequency components are summed by the summer 236 to produce an estimate of the engine noise 240. The estimate of the engine noise 238 is combined with the echo-free microphone signal 115, resulting in the engine noise-free signal 130.

In operation, the engine noise estimator 126 adaptively determines the estimated engine noise 238. That is, the engine noise estimator 126 adapts the N sets of harmonic frequency weighting coefficients 234 to converge to the engine noise-free signal 130. Thus, the engine noise-free signal 130 can also be viewed as an error signal for an adaptive filter. This error signal 130 is passed to an adaptation control module 240 which uses the error signal 130 to determine a coefficient update for the N sets of harmonic frequency weighting coefficients 234. In some examples, the adaptation control module 240 determines the coefficient update using a least mean squared (LMS) approach. In other examples, the adaptation control module 240 determines the coefficient update using a recursive least squares (RLS) approach. In some examples, the adaptation control block 240 adjusts its rate of adaptation based on short time characteristics of the speech signal. For example, the rate of adaptation may be reduced when a speech signal is present, thereby minimizing the impact of the speech on the estimated engine noise signal 238.

The coefficient update determined by the adaptation control module 240 is passed to the N sets of harmonic frequency weighting coefficients 234, at which time the harmonic frequency weighting coefficients 234 are updated.

The N sets of harmonic frequency weighting coefficients 234 eventually converge to a state where combination of the estimate of the engine noise 238 and the echo-free microphone signal 115 is minimized. In this state, the result of subtracting the estimated engine noise 238 from the echo-free microphone signal 115 is substantially an engine noise-free signal 130. The engine noise-free signal 130 is passed out of the engine noise estimation module 126 for use by the hands-free communication device 100. In some examples, the estimated engine noise 238 is also passed out of the engine noise estimation module 126 for use by the hands-free communication device 100.

3 Alternative Embodiments

In some examples it may be desirable to transmit a harmonically enhanced version of the engine noise to another party during a telephone conversation. For example, one may want to transmit the engine noise when they are accelerating in their sports car.

Figure 3:
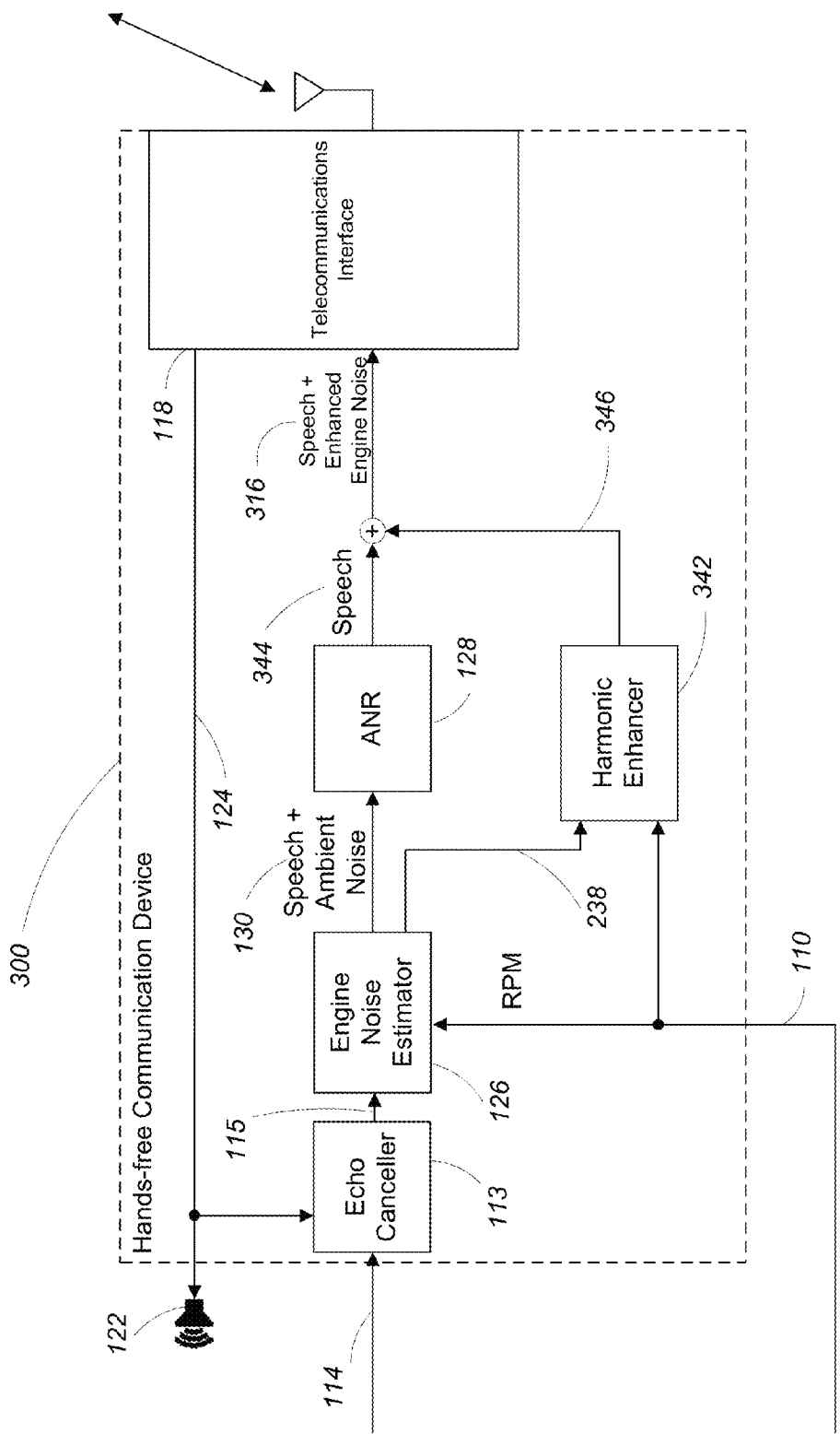
FIG. 3 is a block diagram of a second hands-free communication device.

Referring to FIG. 3, a hands-free communication device 300 operates in a similar manner to the hands-free communication device 100 of FIG. 1. The main difference between the two hands-free communication devices 100, 300 is that the hands-free communication device 300 of FIG. 3 includes a harmonic enhancer 342 which receives the estimated engine noise 238 from the engine noise estimator 126 and the RPM signal 110 as inputs and uses the inputs to form a harmonically enhanced version of the estimated engine noise 346.

In general, the harmonic enhancer 342 applies a desired spectral shape (e.g., a spectral shape which is predefined by the automobile manufacturer) to the estimated engine noise 238 to achieve a desired engine sound. In operation, the harmonic enhancer 342 determines desired spectral shape based on the RPM signal 110 and applies the shape the estimated engine noise 238, resulting in the harmonically enhanced version of the estimated engine noise 346. In some examples, the desired spectral shape is determined based on other engine characteristics such as torque, engine load, etc. In some examples, the harmonic enhancer 342 operates on the individual harmonics of the estimated engine noise 346 to apply the desired spectral shape. In other examples, the desired spectral shape is applied as a frequency domain filter. In other examples, the desired spectral shape is applied as a time domain filter.

The hands-free communication device 300 then forms a signal 316 for transmission by combining the harmonically enhanced version of the estimated engine noise 346 with the output 344 of the ANR module 128. In this way, the operator (FIG. 1, element 105) can allow the remote telephone user (FIG. 1, element 107) to listen to the harmonically enhanced version of the estimated engine noise 346.

Further description of forming a harmonically enhanced version of the engine noise can be found in 300783" which is incorporated herein by reference.

In some examples it may be desirable to transmit music which is playing in a vehicle to another party during a telephone conversation. Doing so electronically rather than by turning up the volume in the vehicle enhances such an experience.

Figure 4:
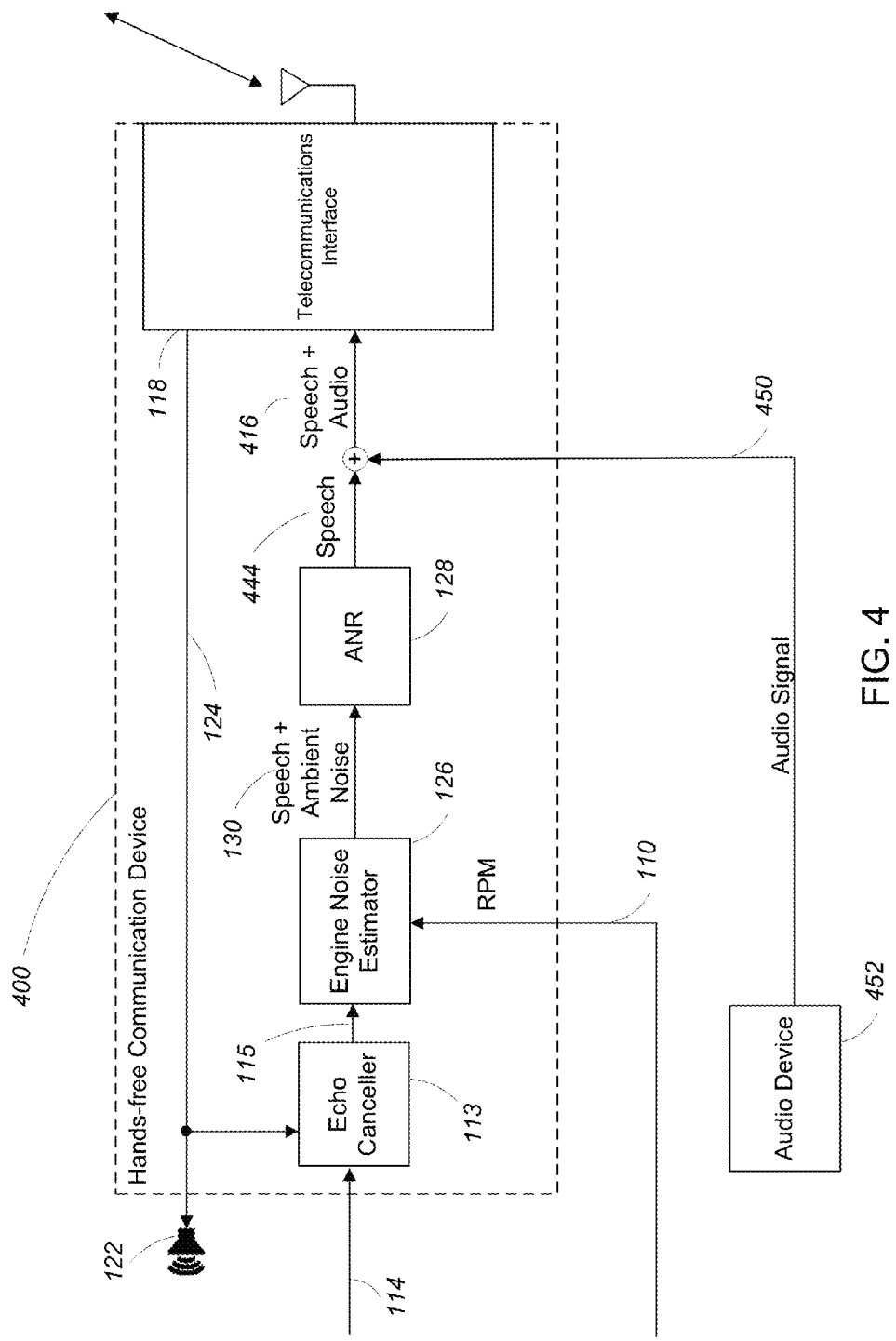
FIG. 4 is a block diagram of a third hands-free communication device.

Referring to FIG. 4, a hands-free communication device 400 operates in a similar manner to the hands-free communication device 100 of FIG. 1. The main difference between the two hands-free communication devices 100, 400 is that the hands-free communication device 400 of FIG. 4 receives an audio signal 450 (e.g., a signal including music) from an audio device 452 (e.g., an MP3 player, radio, or CD player). The hands-free communication device 400 combines the audio signal 450 with the output 444 of the ANR module 128 to form a signal 416 for transmission. In this way, the operator (FIG. 1, element 105) can allow the remote telephone user (FIG. 1, element 107) to listen to the audio signal 450 which they are playing through their automobile's speaker system.

4 Implementations

Systems that implement the techniques described above can be implemented in software, in firmware, in digital electronic circuitry, or in computer hardware, or in combinations of them. The system can include a computer program product tangibly embodied in a machine-readable storage device for execution by a programmable processor, and method steps can be performed by a programmable processor executing a program of instructions to perform functions by operating on input data and generating output. The system can be implemented in one or more computer programs that are executable on a programmable system including at least one programmable processor coupled to receive data and instructions from, and to transmit data and instructions to, a data storage system, at least one input device, and at least one output device. Each data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

It is to be understood that the foregoing description is intended to illustrate and not to limit the scope of the invention, which is defined by the scope of the appended claims. Other embodiments are within the scope of the following claims.

What is claimed is:

1. An automobile communication system comprising:
   a first signal input for receiving an input signal from a sensor;
   a second signal input for receiving a first signal representing a rotational frequency associated with a portion of an engine of the automobile;
   an engine noise estimation module configured to determine, from the input signal and the first signal, an estimate of an engine-related component of the input signal, wherein the engine noise estimation module includes a signal combination module configured to combine the estimate of the engine-related component with the input signal to form a modified input signal; and
   a transmitter configured to transmit the modified input signal as part of an outgoing communication.

2. The system of claim 1 wherein the signal combination module is configured to remove the estimate of the engine-related component from the input signal.

3. The system of claim 1 wherein the signal combination module is configured to form a harmonically-enhanced version of the estimate of the engine-related component and add the harmonically-enhanced version of the estimate of the engine-related component to the input signal to achieve a desired engine sound.

4. The system of claim 3 wherein the signal combination module includes a spectral shaping module configured to form the harmonically-enhanced version of the estimate of the engine-related component including altering the spectral shape of the estimate of the engine-related component.

5. The system of claim 1 further comprising:
   an audio input for accepting an audio signal from an audio system of the automobile; and
   wherein the signal combination module is further configured to combine the estimate of the engine-related component with the input signal and the audio signal to form the modified input signal.

6. The system of claim 1 wherein the first signal is associated with a number of revolutions per minute (RPM) of the engine of the automobile.

7. The system of claim 1 wherein the engine noise estimation module further includes
   a plurality of harmonic generators for generating a plurality of harmonics based on the first signal; and
   a multi-input adaptive linear combiner for combining the plurality of harmonics.

8. A method of enhancing communications in an automobile communication system, the method comprising:
   receiving an input signal from a sensor;
   receiving a first signal representing a rotational frequency associated with a portion of an engine of the automobile;
   determining, from the input signal and the first signal, an estimate of an engine-related component of the input signal;
   forming a modified input signal, including combining the estimate of the engine-related component with the input signal; and
   transmitting the modified input signal as part of an outgoing communication.

9. The method of claim 8 wherein combining the estimate of the engine-related component with the input signal includes removing the estimate of the engine-related component from the input signal.

10. The method of claim 8 wherein combining the estimate of the engine-related component with the input signal includes forming a harmonically-enhanced version of the estimate of the engine-related component and adding the harmonically-enhanced version of the estimate of the engine-related component to the input signal to achieve a desired engine sound.

11. The method of claim 10 wherein forming the harmonically-enhanced version of the estimate of the engine-related component includes altering the spectral shape of the estimate of the engine-related component.

12. The method of claim 8 further comprising:
   accepting an audio signal from an audio system of the automobile; and
   wherein forming the modified input signal further includes adding the audio signal to the input signal.

13. The method of claim 8 wherein the first signal is associated with a number of revolutions per minute (RPM) of the engine of the automobile.

14. The method of claim 8 wherein determining the estimate of the engine-related component of the input signal includes generating a plurality of harmonics based on the first signal and combining the plurality of harmonics using a multi-input adaptive linear combiner.

* * * * *